US011903055B2

(12) United States Patent
Osawa et al.

(10) Patent No.: US 11,903,055 B2
(45) Date of Patent: Feb. 13, 2024

(54) TERMINAL AND COMMUNICATION METHOD FOR CONTROLLING TRANSMISSION BASED ON TRANSMISSION DENSITY

(71) Applicant: NTT DOCOMO, INC., Tokyo (JP)

(72) Inventors: Ryosuke Osawa, Tokyo (JP); Yuichi Kakishima, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 154 days.

(21) Appl. No.: 17/261,409

(22) PCT Filed: Jul. 24, 2018

(86) PCT No.: PCT/JP2018/027754
§ 371 (c)(1),
(2) Date: Jan. 19, 2021

(87) PCT Pub. No.: WO2020/021640
PCT Pub. Date: Jan. 30, 2020

(65) Prior Publication Data
US 2021/0266995 A1   Aug. 26, 2021

(51) Int. Cl.
*H04W 76/14* (2018.01)
*H04W 72/04* (2023.01)

(52) U.S. Cl.
CPC ........... *H04W 76/14* (2018.02); *H04W 72/04* (2013.01)

(58) Field of Classification Search
CPC .............................. H04W 76/14; H04W 72/04
See application file for complete search history.

(56) References Cited

U.S. PATENT DOCUMENTS

| | | | |
|---|---|---|---|
| 2011/0134879 A1 | 6/2011 | Ogawa et al. | |
| 2014/0010131 A1* | 1/2014 | Gaal | H04L 5/001 370/311 |

(Continued)

FOREIGN PATENT DOCUMENTS

| | | |
|---|---|---|
| JP | 2017-515323 A | 6/2017 |
| WO | 2010/016240 A1 | 2/2010 |

(Continued)

OTHER PUBLICATIONS

Office Action issued in counterpart Japanese Patent Application No. 2020-531880 dated Dec. 20, 2022 (7 pages).

(Continued)

*Primary Examiner* — Gary Mui
(74) *Attorney, Agent, or Firm* — Osha Bergman Watanabe & Burton LLP (57) ABSTRACT

The user equipment comprises a reception unit configured to receive allocation information of reference signals from a base station apparatus or a first user equipment, the reference signals being used in a device-to-device direct communication; a control unit for determining a device-to-device direct communication signal based on the allocation information of reference signals used in the device-to-device direct communication; and a transmitter configured to transmit the determined device-to-device direct communication signal to a second user equipment, wherein the allocation information of reference signals used in the device-to-device direct communication includes a transmission density of the reference signals used in the device-to-device direct communication.

5 Claims, 7 Drawing Sheets

(56) References Cited

U.S. PATENT DOCUMENTS

| | | | |
|---|---|---|---|
| 2014/0269641 A1* | 9/2014 | Jang | H04L 27/2692 |
| | | | 370/336 |
| 2016/0248562 A1 | 8/2016 | Nam et al. | |
| 2017/0366377 A1* | 12/2017 | Papasakellariou | |
| | | | H04L 27/2613 |
| 2018/0131492 A1 | 5/2018 | John Wilson et al. | |
| 2018/0183554 A1 | 6/2018 | Lim et al. | |
| 2018/0279299 A1* | 9/2018 | Park | H04W 72/0413 |
| 2018/0323933 A1* | 11/2018 | Nam | H04W 72/12 |
| 2019/0173639 A1 | 6/2019 | Tang | |
| 2019/0229964 A1* | 7/2019 | Ouchi | H04L 5/0051 |
| 2019/0239174 A1 | 8/2019 | Harada et al. | |
| 2019/0305911 A1* | 10/2019 | Sarkis | H04L 5/006 |
| 2020/0187248 A1* | 6/2020 | Lee | H04W 74/004 |
| 2020/0195399 A1 | 6/2020 | Sano et al. | |
| 2021/0076236 A1* | 3/2021 | Kimura | H04W 24/08 |

FOREIGN PATENT DOCUMENTS

| | | |
|---|---|---|
| WO | 2018/008574 A1 | 1/2018 |
| WO | 2018/040091 A1 | 3/2018 |
| WO | 2018/069257 A1 | 4/2018 |
| WO | WO-2018069257 A1 * | 4/2018 ... H04B 7/0684 |
| WO | 2018/088486 A1 | 5/2018 |
| WO | 2018/113946 A1 | 6/2018 |

OTHER PUBLICATIONS

Extended European Search Report issued in counterpart European Patent Application No. 18927754.4, dated Jan. 25, 2022 (8 pages).
International Search Report issued in PCT/JP2018/027754 dated Oct. 23, 2018 (4 pages).
Written Opinion of the International Searching Authority issued in PCT/JP2018/027754 dated Oct. 23, 2018 (4 pages).
3GPP TS 36.211 V15.2.0; "3rd Generation Partnership Project; Technical Specification Group Radio Access Network; Evolved Universal Terrestrial Radio Access (E-UTRA); Physical channels and modulation (Release 15)"; Jun. 2018 (236 pages).
3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
Huawei, HiSilicon; "Discussion on sidelink resource allocation and configuration"; 3GPP TSG RAN WG1 Meeting #90, R1-1712135; Prague, Czech Republic, Aug. 21-25, 2017 (6 pages).
Decision of Dismissal of Amendment issued in counterpart Japanese Patent Application No. 2020-531880 dated May 30, 2023 (5 pages).

\* cited by examiner

TERMINAL AND COMMUNICATION METHOD FOR CONTROLLING TRANSMISSION BASED ON TRANSMISSION DENSITY

TECHNICAL FIELD

The present invention relates to a user equipment and a base station apparatus in a wireless communication system.

BACKGROUND ART

In LTE (Long Term Evolution) and LTE successor systems (e.g., LTE-A (LTE Advanced), NR (New Radio) (also referred to as 5G)), a D2D (Device-to-Device) technology has been discussed, in which user equipments directly communicate each other not via a wireless base station (see, Non-Patent Document 1).

The D2D alleviates traffic between the user equipment and the base station apparatus, and enables the user equipments to communicate with each other even if it is impossible for the base station apparatus to communicate at a time of disaster or the like. Although the D2D is referred to as "sidelink" in 0.3GPP (3rd Generation Partnership Project), the term of D2D will be used in this disclosure, which is a more general term. However, the term of sidelink may be used if necessary in the later description.

A D2D communication may be generally classified into "a D2D discovery" for finding other communicable user equipment and "a D2D communication" (also referred to as "D2D direct communication", "device-to-device direct communication" or the like) for directly communicating between the user equipments. In the following description, the D2D communication, the D2D discovery or the like may be simply referred to as "a D2D" when they are not particularly distinguished. In addition, a signal transmitted and/or received in the D2D may be referred to as a D2D signal. A variety of use cases for a V2X (Vehicle to Everything) in the NR have been studied (see, Non-Patent Document 2).

RELATED-ART DOCUMENTS

Non Patent Document

Non Patent Document 1: 3GPP TS 36.211 V15.2.0 (2018-06)
Non Patent Document 2: 3GPP TR 22.886 V15.1.0 (2017-03)

SUMMARY OF THE INVENTION

Problem to be Solved by the Invention

In the V2X, it is envisaged that a communication environment may drastically change according to a relative velocity change because moving directions of vehicles mounting user equipments are different from each other when passing by. However, a reference signal has not been used, which can adapt to the communication environment that drastically changes.

The present invention has been made in light of the above, and it is an object to use an appropriate reference signal in the device-to-device direct communication.

Means to Solve the Problem

According to a disclosed technology, there is provided a user equipment comprising: a reception unit configured to receive allocation information of reference signals from a base station apparatus or a first user equipment, the reference signals being used in a device-to-device direct communication; a control unit configured to determine a device-to-device direct communication signal based on the allocation information of reference signals used in the device-to-device direct communication; and a transmitter for transmitting the determined device-to-device direct communication signal to a second user equipment, wherein the allocation information of reference signals used in the device-to-device direct communication includes a transmission density of the reference signals used in the device-to-device direct communication.

Advantage of the Invention

According to the disclosed technology, an appropriate reference signal can be used in the device-to-device direct communication.

MODE(S) FOR CARRYING OUT THE INVENTION

Hereinafter, an embodiment of the present invention will be described with reference to the drawings. The embodiment described below is merely an example, and an embodiment to which the present invention may be applied is not limited to the following embodiment.

For operations of a wireless communication system according to an embodiment of the present invention, existing techniques are used as appropriate. Although such an existing technique is, for example, existing LTE, the existing techniques are not limited to existing LTE. The term "LTE" as used in this specification has a broad meaning including LTE-Advanced and schemes after LTE-Advanced (for example, NR) unless otherwise specified.

In an embodiment of the present invention, a duplex scheme may be a TDD (Time Division Duplex) scheme, an FDD (Frequency Division Duplex) scheme, or another (for example, Flexible Duplex or the like) scheme different from these schemes.

In the following description, a method of transmitting a signal using a transmission beam may be digital beam forming that transmits the signal multiplied by a precoding vector (precoded with the precoding vector), or analog beamforming that implements beamforming by means of a variable phase shifter in a RF (Radio Frequency) circuit. Similarly, a method of receiving a signal using a receive beam may be digital beamforming that multiplies the received signal by a predetermined weight vector, or analog beamforming that implements beamforming by means of a variable phase shifter in a RF circuit. Hybrid beamforming combining digital beamforming and analog beamforming may be applied. Transmitting a signal using a transmission beam may be transmitting the signal via a particular antenna port. Similarly, receiving a signal using a reception beam may be receiving the signal via a particular antenna port. An antenna port refers to a logical antenna port or a physical antenna port defined in the 3GPP standard. In addition, the precoding or beamforming may be referred to as a precoder or a spatial domain filter or the like.

A method of forming a transmission beam and reception beam is not limited to the above mentioned method. For example, in a base station apparatus 10 or a user equipment 20 each comprising a plurality of antennas, a method changing an angle of each antenna may be used, a method combining the method using the precoding vector with the method changing the angle of each antenna may be used, different antenna panels may be utilized to be switched, a method combining methods using a plurality of antenna panels together may be used, or another method may be used. In addition, for example, a plurality of transmission beams different from each other may be used in a high frequency band. Using a plurality of transmission beams may be referred to as a multi-beam operation and using one transmission beam may be referred to as a single-beam operation.

In an embodiment of the present invention, a phrase "(a wireless parameter or the like) is configured" may include meanings that a predetermined value is pre-configured, and a wireless parameter announced from the base station apparatus 10 or the user equipment 20 is configured.

Figure 1:
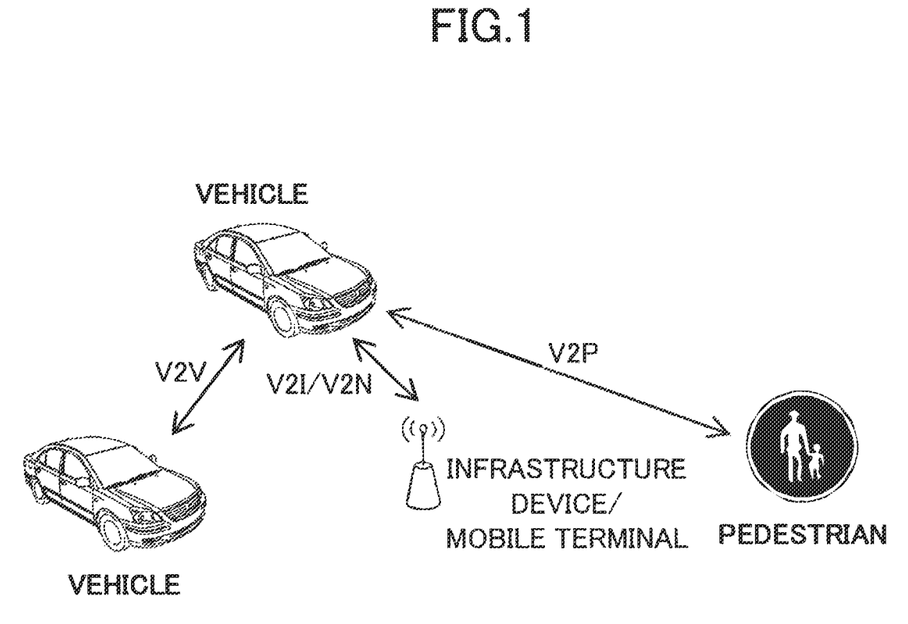
FIG. 1 is a diagram to be used to explain V2X.

FIG. 1 is a diagram to be used to explain a V2X. In 3GPP, it has been studied to realize V2X (Vehicle to Everything) or eV2X (enhanced V2X) by expanding the D2D function. The standardization thereof has been proceeding. As illustrated in FIG. 1, the V2X means a part of ITS (Intelligent Transport Systems), is a generic term of V2V (Vehicle to Vehicle) meaning a form of communication performed between vehicles, V2I (Vehicle to Infrastructure) meaning a form of communication performed between a vehicle and a RSU (Road-Side Unit) provided on a roadside, V2N (Vehicle to Nomadic device) meaning a form of communication performed between a vehicle and a mobile terminal of a driver, and V2P (Vehicle to Pedestrian) meaning a form of communication performed between a vehicle and a mobile terminal of a pedestrian.

In addition, in the 3GPP, a V2X has been studied by means of a cellular communication and a device-to-device communication in a LTE or a NR. With regard to the V2X in the LTE or the NR, it is envisaged to study not limited to the 3GPP specification in the future. For example, it is envisaged to study a way to maintain an interoperability, a way to reduce a implementation cost in a high layer, a way to concurrently use or switch plural RATs (Radio Access Technologies), a way to account for regulations in respective countries, a way to obtain or distribute data of a V2X platform in the LTE or the NR, a way to manage and use a database or the like.

Although in an embodiment of the present invention an aspect that a communication device is mounted in a vehicle is mainly contemplated, the embodiment of the present invention is not limited to the disclosed embodiment. For example, the communication device may be a terminal that a person holds, the communication device may be a device mounted in a drone or an air plane, or the communication device may be a base station, a RSU, a relay station (relay node) or the like.

In addition, a SL (SideLink) may be distinguished based on a UL (Uplink), a DL (Downlink) and one of the following 1)-4) or a combination of the following 1)-4), noting that the SL may be referred to as another name:
 1) a resource allocation in a time domain
 2) a resource allocation in a frequency domain
 3) a synchronization signal (including SLSS (Sidelink Synchronization Signal)) to be referred
 4) a reference signal used in a path loss measurement for a transmission power control.

In addition, with regard to an OFDM (Orthogonal Frequency Division Multiplexing) of the SL or the UL, any one of the following OFDMs may be applied: CP-OFDM (Cyclic-Prefix OFDM), DFT-S-OFDM (Discrete Fourier Transform-Spread-OFDM), an OFDM in which a transform precoding is not performed, or an OFDM in which a transform precoding is performed.

In the SL in the LTE, Mode 3 and Mode 4 are defined with respect to SL resource allocation to a user equipment 20. In Mode 0.3, a transmission resource is dynamically allocated by means of DCI (Downlink Control Information) sent from the base station apparatus 10 to the user equipment 20. In Mode 3, SPS (Semi Persistent Scheduling) is also possible. In Mode 4, the user equipment 20 autonomously selects a transmission resource from a resource pool.

Figure 2:
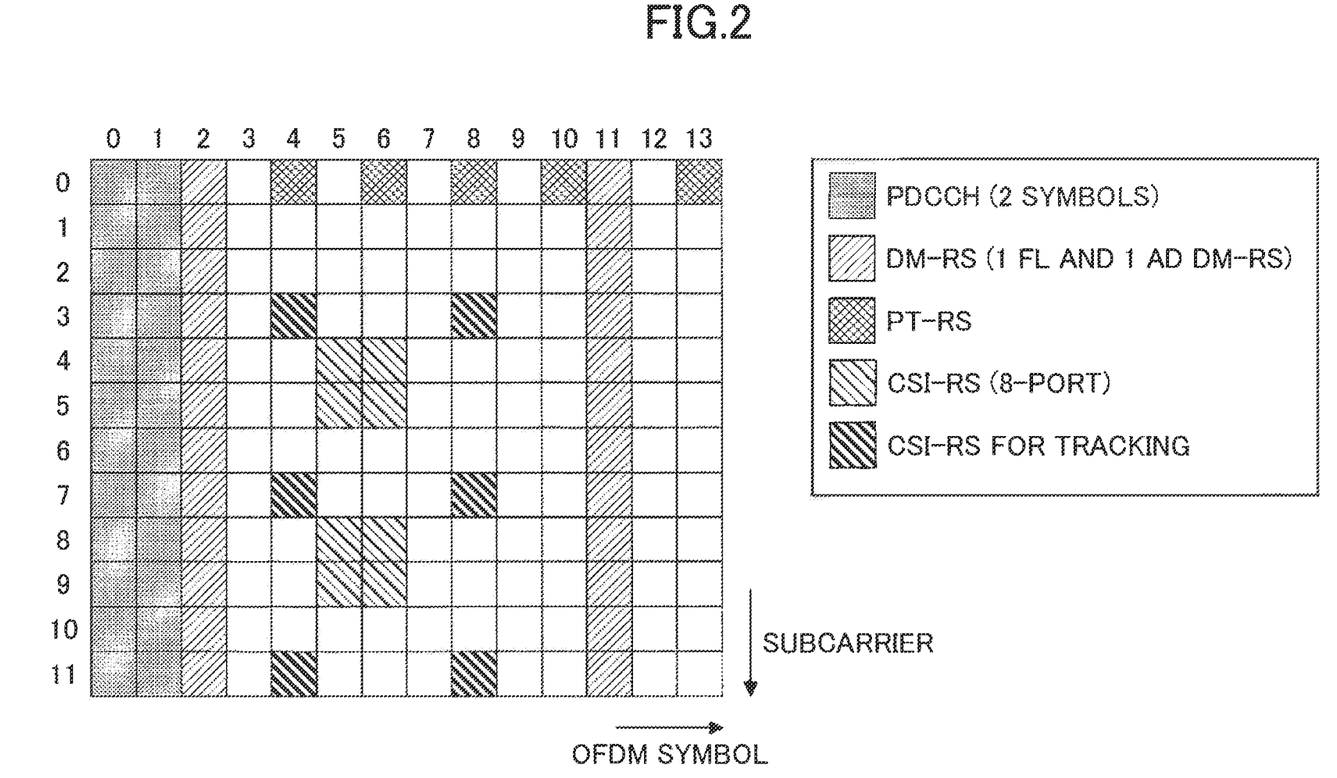
FIG. 2 is a diagram illustrating an example of a reference signal allocation in an embodiment of the present invention.

FIG. 2 is a diagram illustrating an example of a reference signal allocation in an embodiment of the present invention. In FIG. 2, reference signals are allocated in resources in a wireless frame, the resources being identified by means of an OFDM symbol corresponding to the time domain and a subcarrier corresponding to the frequency domain. 14 OFDM symbols from #0 to #13 are shown, which correspond to 1 slot in the NR. 12 subcarriers from #0 to #11 are shown, which correspond to 1 resource block. In addition, although FIG. 2 illustrates a DL wireless frame in the NR, a reference signal allocation may be used in a UL or a SL wireless frame similar to FIG. 2.

As shown in FIG. 2, PDCCH (Physical downlink control channel) is allocated in the OFDM symbols #0 and #1 within one resource block. DMRS (Demodulation reference symbol) is allocated in the OFDM symbols #2 and #11 within one resource block. The DMRS is a reference signal to be used mainly for demodulation. The DMRS allocated in the OFDM symbol #2 may be referred to as "Front-loaded DRMS" while the DMRS allocated in the OFDM symbol #11 may be referred to as "Additional DRMS". PTRS (Phase tracking reference signal) is allocated in the subcarrier #0 of the OFDM symbols #4, #6, #8, #10 and #13. The PTRS is a reference signal to be used mainly for phase correction. CSI-RS (Channel-state information reference signal) (8-port) is allocated in the subcarriers #4, #5, #8 and #9 of the OFDM symbols #5 and #6. The CSI-RS (8-port) is mainly used to estimate a channel state. The 8-port indicates an antenna port from which the CSI-RS is transmitted. CSI-RS for tracking is allocated in the subcarriers #3, #7 and

11 of the OFDM symbols #4 and #8. The CSI-RS for tracking is mainly used for tracking in the time domain and the frequency domain.

In a scenario of a high speed movement and a millimeter wave transmission in the NR, a tracking precision is required for noise reduction in the frequency and/or the time domain. Thus, the above mentioned PTRS and CSI-RS for tracking are supported. A transmission time interval of the PTRS and the CSI-RS may be semi-persistently configured.

Figure 3:
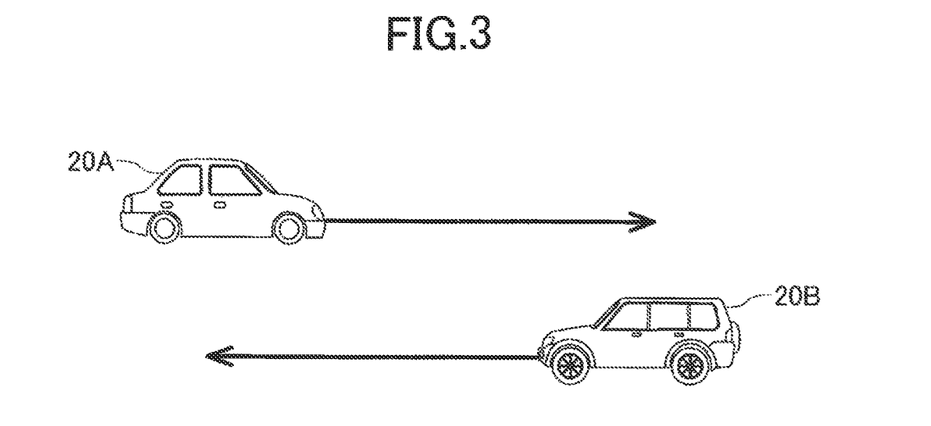
FIG. 3 is a diagram illustrating an example (1) of a communication environment in an embodiment of the present invention.

FIG. 3 is a diagram illustrating an example (1) of a communication environment in an embodiment of the present invention. When the PTRS and/or the CSI-RS are supported in the SL communication, a transmission density of the PTRS and/or the CSI-RS needs to be more dynamically controlled because a relative velocity of transceiver terminals is drastically changed, e.g., when vehicles each of which mounts a user equipment 20A or a user equipment 20B, respectively, pass by, as illustrated in FIG. 3. It is possible to use reference signals to improve a quality of the SL communication by more dynamically controlling the transmission density of the PTRS and/or the CSI-RS, the reference signals adapting to a change of a communication environment. The PTRS introduced to the SL may be referred to as "SL-PTRS" while the CSI-RS introduced to the SL may be referred to as "S-CSI-RS".

Figure 4:
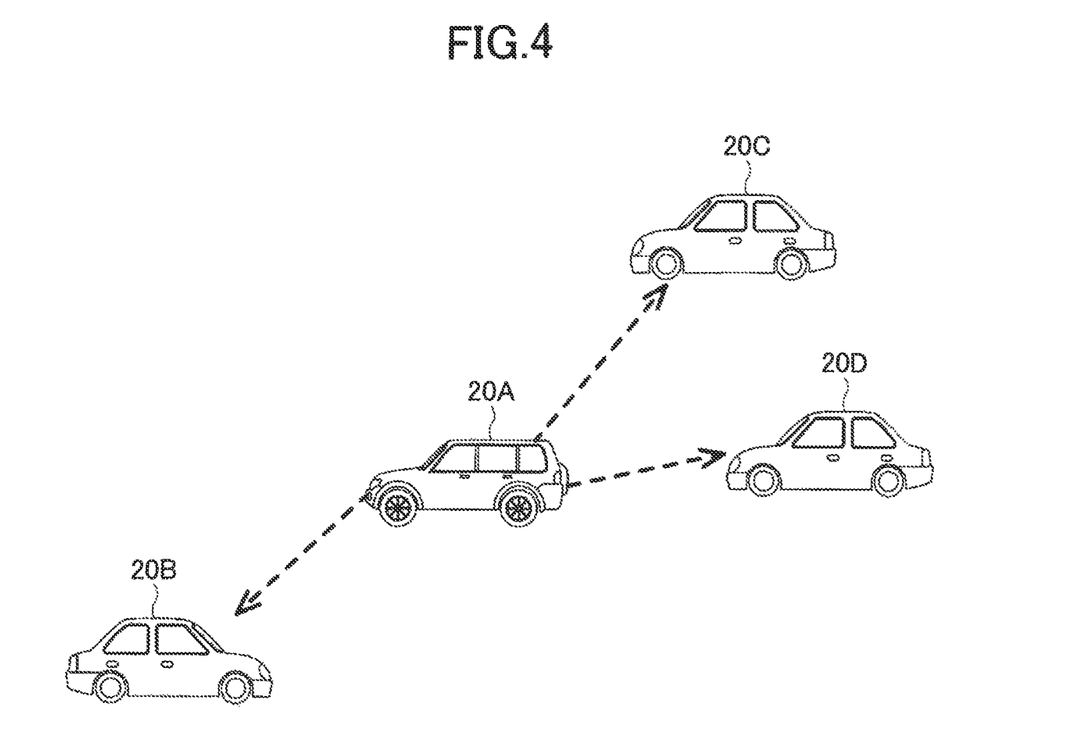
FIG. 4 is a diagram illustrating an example (2) of a communication environment in an embodiment of the present invention.

FIG. 4 is a diagram illustrating an example (2) of a communication environment in an embodiment of the present invention. As shown in FIG. 4, when the user equipment 20A multicasts or broadcasts to the user equipments 20B, 20C and 20D in the SL communication, it is not uniquely determined with which one of user equipments 20B-D the SL communication should be optimized with respect to the configuration of the PTRS and/or the CSI-RS. Thus, it is required to define the configuration of the PTRS and/or the CSI-RS when the multicast or the broadcast is performed in the SL communication.

Figure 5:
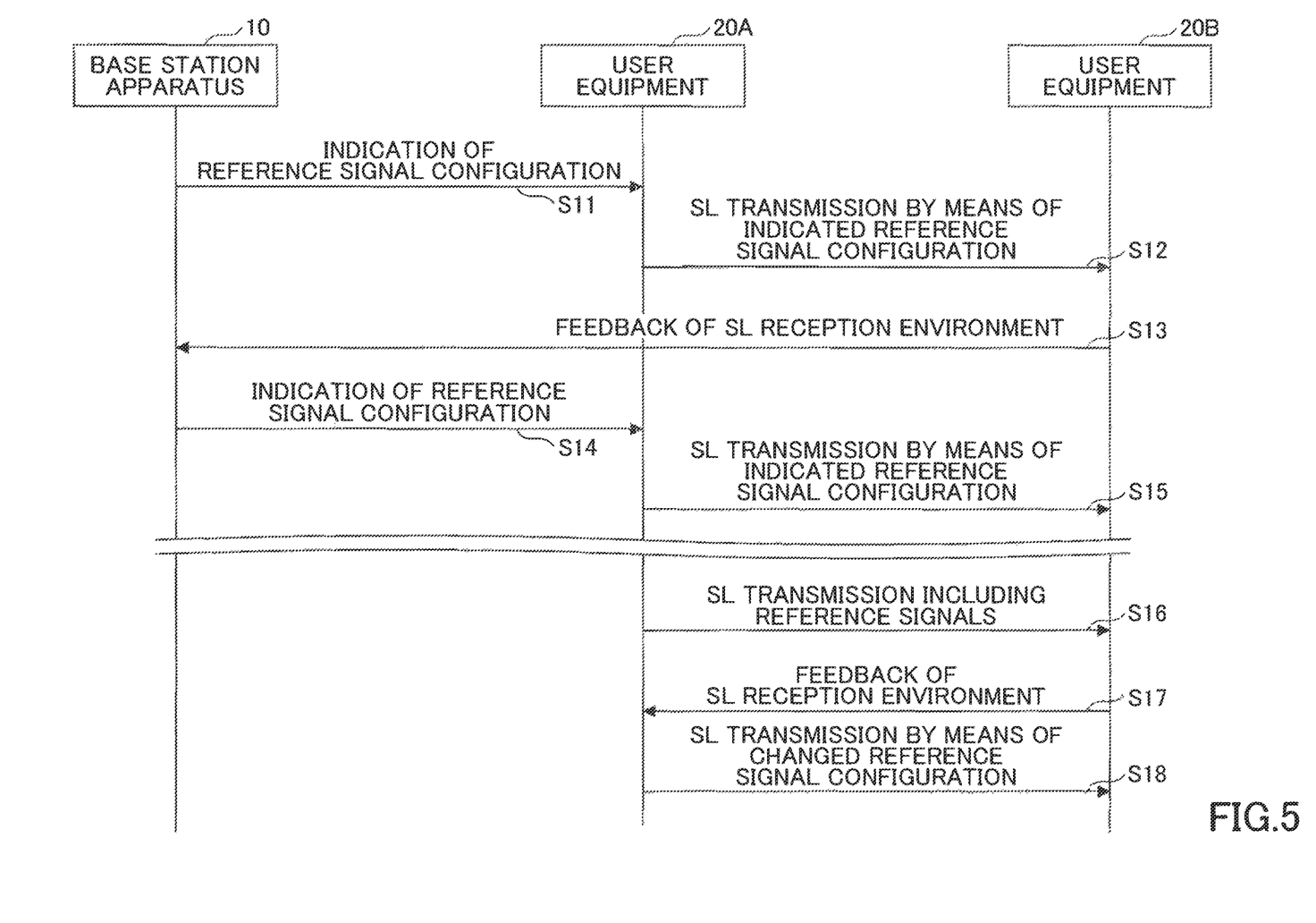
FIG. 5 is a sequence diagram to be used to explain a SL communication in an embodiment of the present invention.

FIG. 5 is a sequence diagram to be used to explain a SL communication in an embodiment of the present invention. Referring to FIG. 5, procedures are described, in which a base station apparatus 10 or a user equipment 20 having a scheduling capability dynamically indicates the SL-PTRS and/or the SL-CSI-RS to the user equipment 20 performing a SL transmission. The user equipment 20 having a scheduling capability is a user equipment 20 that, autonomously or based on an indication from the base station apparatus 10, determines at least one of a MCS (Modulation and Coding Scheme), a TBS (Transport block size), a rank or the number of transmission layers, a resource allocation, a transmission power, and a transmission timing; and indicates the determination(s) to another user equipment 20.

In Step S11, the base station apparatus 10 indicates the transmission density of the SL-PTRS and/or the SL-CSI-RS to the user equipment 20A through a PHY (Physical) layer signaling or a MAC (Medium Access Control) layer signaling. A candidate transmission pattern of a SL-PTRS and/or a SL-CSI-RS to be switched may be predetermined in a specification, or the user equipment 20 may obtain the candidate transmission pattern by means of a RRC (Radio Resource Control) configuration. The base station apparatus 10 may indicate an index corresponding to a transmission pattern to the user equipment 20A through the PHY layer signaling or the MAC layer signaling, and thus the user equipment 20A may switch the transmission pattern of the SL-PTRS and/or the SL-CSI-RS.

For example, the transmission pattern of the SL-PTRS and/or the SL-CSI-RS may include one or more of the following 1)-5):

1) a mapping pattern in the frequency domain or the time domain in a resource or a resource pool
2) a start point or an end point of a RE (resource element) to which a reference signal is allocated
3) an interval of REs to which reference signals are allocated
4) an interval of RBs (resource blocks) to which reference signals are allocated
5) an index of a slot to which a reference signal is allocated.

The step of indicating the transmission pattern of the SL-PTRS and/or the SL-CSI-RS in Step S11 may be performed by means of the PHY layer signaling or the MAC layer signaling through a DL signal such as a PBCH (Physical broadcast channel), a PDCCH or a PDSCH (Physical downlink shared channel).

In addition, the base station apparatus 10 in Step S11 and Step S14 may be replaced with a user equipment having a scheduling capability. When it is replaced, the step of indicating the transmission pattern of the SL-PTRS and/or the SL-CSI-RS in Step S11 may be performed by means of the PHY layer signaling or the MAC layer signaling through a SL signal such as a PSBCH (Physical Sidelink Broadcast Channel), a PSCCH (Physical Sidelink Control Channel), or a PSSCH (Physical Sidelink Shared Channel). In addition, the step of indicating the transmission pattern of the SL-PTRS and/or the SL-CSI-RS in Step S1 and Step S14 may be determined based on a sequence of a reference signal. The sequence of the reference signal may be determined by identifying a sequence of the SL-PTRS, a SL-CSI-RS or a SLSS, the sequence of the reference signal being received in resource elements to which the reference signals are commonly allocated for all transmission patterns. In Steps S12, S15, S16 and S18, the user equipment 20B may identify the transmission pattern of the SL-PTRS and/or the SL-CSI-RS based on the sequence of the reference signal.

In Step S12, the user equipment 20A transmits a SL signal to the user equipment 20B, the SL signal being determined based on the reference signal configuration indicated by the base station apparatus 10. By switching the transmission pattern of the S-PTRS and/or the SL-CSI-RS based on the configuration indication of the reference signal, the user equipment 20A can change a transmission density of reference signals to that required for the SL communication.

In Step S13, the user equipment 20B transmits a feedback signal of a SL reception environment to the base station apparatus 10. The feedback information may include one or more of the following 1)-4):

1) A CQI (Channel quality indicator), a BLER (Block error rate), a RSRP (Reference Signal Received Power), a RSRQ (Reference Signal Received Quality), a SINR (Signal-to-Interference plus Noise power Ratio), a Doppler shift, or other information indicating a reception quality or a movement velocity. In order to represent that they are based on the SL measurement or demodulation, they may be referred to as, e.g., SL-CQI, SL-BLER or the like.
2) One bit or two or more bits of information directly indicating increase or decrease of a density of a SL-PTRS and/or the SL-CSI-RS. The two or more bits of information may indicate a greater increase or decrease than an increase or decrease indicated by means of one bit of information.
3) Information indicating a transmission pattern of a SL-PTRS and/or a SL-CSI-RS.

4) A one bit flag. For example, it may be transmitted when an increase of the density of the SL-PTRS and/or the SL-CSI-RS is required.

In addition, the feedback in Step S13 may be transmitted to the base station apparatus 10 by means of a UL signal through a PUCCH (Physical uplink control channel) or a PUSCH (Physical uplink shared channel), or may be transmitted by means of a SL signal through a PSCCH or a PSSCH to a transmission side user equipment 20 or a user equipment 20 having a scheduling capability.

In Step S14, the base station apparatus 10 transmits a reference signal configuration to the user equipment 20B similar to Step S11, the reference signal configuration being determined to adapt the SL reception environment in the user equipment 20B based on the feedback of the SL reception environment received from the user equipment 20B. In Step S15, the user equipment 20A transmits a SL signal to the user equipment 20B, the SL signal being determined based on the reference signal configuration indicated by the base station apparatus 10 similar to Step S12. For example, after Step S15, the user equipment 20B may transmit a feedback of a SL reception environment to the base station apparatus 10 similar to Step S13.

In addition, the transmission side user equipment 20 may autonomously switch the transmission pattern of the SL-PTRS and/or the SL-CSI-RS. In Step S16, the user equipment 20A performs a SL transmission to the user equipment 20B by means of the reference signal configuration that is autonomously determined. The autonomously determined transmission pattern of the SL-PTRS and/or the SL-CSI-RS may be similar to Step S11.

The transmission pattern of the SL-PTRS and/or the SL-CSI-RS may be explicitly indicated from the transmission side user equipment 20A to a reception side user equipment 20B, or the reception side user equipment 20B may detect it by means of a blind detection. For example, the transmission pattern of the SL-PTRS and/or the SL-CSI-RS may be explicitly indicated by means of a SL signal through a PSBCH, a PSCCH or a PSSCH, or implicitly detected based on an increase of a SL-PTRS, a CSI-RS or a SLSS.

In Step S17, the user equipment 20B transmits a feedback of a SL reception environment to the user equipment 20A similar to Step S13. In Step S18, the user equipment 20A transmits a reference signal configuration to the user equipment 20B similar to Step S16, the reference signal configuration being determined to adapt to a SL reception environment in the user equipment 20B based on the feedback of the SL reception environment received from the user equipment 20B similar to Step S14.

Figure 6:
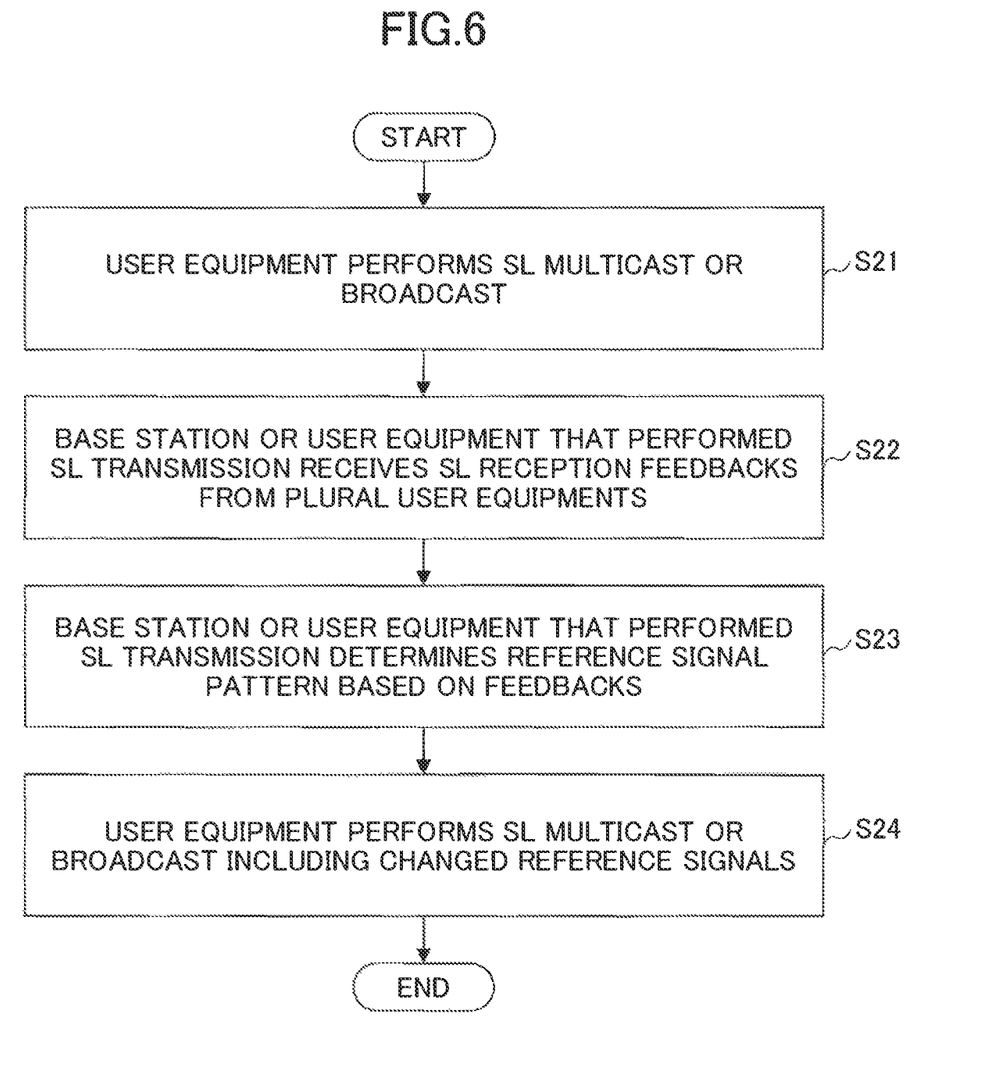
FIG. 6 is a flowchart to be used to explain a SL communication with plural user equipments 20 in an embodiment of the present invention.

FIG. 6 is a flowchart to be used to explain a SL communication with plural user equipments 20 in an embodiment of the present invention. With reference to FIG. 6, a configuration of a SL reference signal is described where a user equipment 20 performs a multicast or broadcast SL communication. In addition, in FIG. 6, a base station apparatus 10 may be replaced with a user equipment 20 having a scheduling capability.

In Step S21, the user equipment 20 performs the SL multicast or broadcast. Next, the base station 10 or the user equipment 20 that performed the SL transmission receives SL reception feedback signals from plural user equipments 20 that received the SL multicast or broadcast (S22).

In Step S23, the base station 10 or the user equipment 20 that performed the SL transmission determines a reference signal pattern based on the plural feedbacks received in Step S22. For example, the selection of the transmission pattern of the SL-PTRS and/or the SL-CSI-RS may be one of the following methods 1)-3):

1) to select a transmission pattern in which a transmission density is high, which adapts to the worst case of the reception environment among the feedbacks.
2) to select a transmission pattern in which a transmission density is low, which adapts to the best case of the reception environment among the feedbacks.
3) to select a transmission pattern having a transmission density adapting to a reception environment to be a median value or an average value of the feedbacks.

In addition, a referenced feedback of the plural feedbacks may be a feedback having the best communication quality indicated by means of a RSRP, a RSRQ, a SINR or the like, may be top N feedbacks, or may be a feedback equal to or greater than a predetermined threshold. Alternatively, a referenced feedback of the plural feedbacks may be a feedback having the worst communication quality indicated by means of a RSRP, a RSRQ, a SINR or the like, may be bottom N feedbacks, or may be a feedback equal to or less than a predetermined threshold.

The determination of the reference signal pattern in Step S23 may be performed by the base station apparatus 10 or the user equipment 20 having the scheduling capability, or may be autonomously performed by the user equipment 20 that performed the SL transmission.

In Step S24, the user equipment 20 performs a SL multicast or broadcast including reference signals changed based on the reference signal pattern that the base station apparatus 10, the user equipment 20 having a scheduling capability, or the user equipment itself has determined.

Although the exemplary reference signal configuration described in FIG. 5 or FIG. 6 is applied to a SL, it may be applied to a DL or a UL similar to the SL. In addition, the reference signal configuration described in FIG. 5 or FIG. 6 is not limited to the SL-PTRS and/or the SL-CSI-RS, and may also be applied to another reference signal or synchronization signal. A step of controlling the transmission density of the reference signals may be applied to a transmission density or the number of transmissions in a repetition transmission of a control signal or data, or the like.

Some or all of a transmission pattern of a SL-PTRS and/or a SL-CSI-RS and/or SL resources may be common to a UL or a DL. For example, when a resource is common to both a SL and a UL or a DL, it means that the SL and the UL or the DL share the reference signal. In addition, in the reference signal configuration described in FIG. 5 or FIG. 6, the base station apparatus 10 may be replaced not only with the user equipment 20 having a scheduling capability, but also with a relay station or the like.

According to the above mentioned embodiment, it is possible to continue a device-to-device direct communication by dynamically switching an allocation pattern of reference signals, even in an un-stable communication environment in which a relative velocity between user equipments drastically changes. In addition, it is possible to perform a device-to-device direct communication suitable for a communication environment by switching to an allocation pattern of reference signals based on a feedback obtained from a reception side user equipment, the allocation pattern being determined by a base station apparatus or a user equipment. In addition, when a SL communication is a multicast or a broadcast, it is possible to switch to an appropriate allocation pattern of reference signals.

Thus, it is possible to use the appropriate reference signal in the device-to-device direct communication.

(Device Configuration)

Next, functional configuration examples of the base station apparatus 10 and the user equipment 20 that perform the processing and operations described above will be described. Each of the base station apparatus 10 and the user equipment 20 includes functions implementing the described embodiment. However, each of the base station apparatus 10 and the user equipment 20 may comprise only some functions in the embodiment.

<Base Station Apparatus 10>

Figure 7:
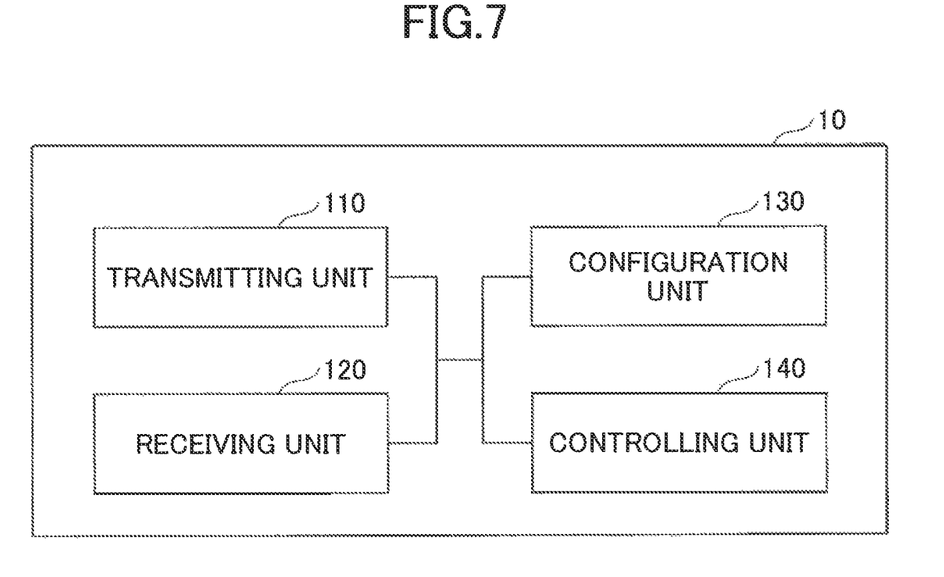
FIG. 7 is a diagram illustrating an example of a functional configuration of a base station apparatus 10 in an embodiment of the present invention.

FIG. 7 is a diagram illustrating an example of a functional configuration of the base station apparatus 10. As illustrated in FIG. 7, the base station apparatus 10 comprises a transmitting unit 110, a receiving unit 120, a configuration unit 130, and a controlling unit 140. The functional configuration illustrated in FIG. 7 is merely an example. Any of functional sections and names of functional units may be used as long as the operations according to an embodiment of the present invention can be performed.

The transmitting unit 110 includes a function that generates a signal to be transmitted to the user equipment 20 side and wirelessly transmits the signal. The receiving unit 120 includes a function that receives various signals transmitted from the user equipment 20 and, for example, obtains information of a higher layer from the received signal. Also, the transmitting unit 110 has a function that transmits NR-PSS, NR-SSS, NR-PBCH, DL/UL control signals or the like to the user equipment 20. Further, the transmitting unit 110 transmits information indicating that another terminal is close to the user equipment 20 while the receiving unit 120 receives information from the user equipment 20.

The configuration unit 130 stores configuration information in a memory device, and reads out from the memory device if necessary, the configuration information including the predetermined configuration information and various pieces of configuration information to be transmitted to the user equipment 20. Content of the configuration information may be, for example, information of reference signals for a D2D communication or the like.

The controlling unit 140 performs configuration operations to perform a D2D communication in the user equipment 20 as described in the embodiment. Also, the controlling unit 140 performs operations with respect to reference signals in the D2D communication. A functional unit with respect to a signal transmission in the controlling unit 140 may be included in the transmitting unit 110. Also, a functional unit with respect to a signal reception in the controlling unit 140 may be included in the receiving unit 120.

<User Equipment>

Figure 8:
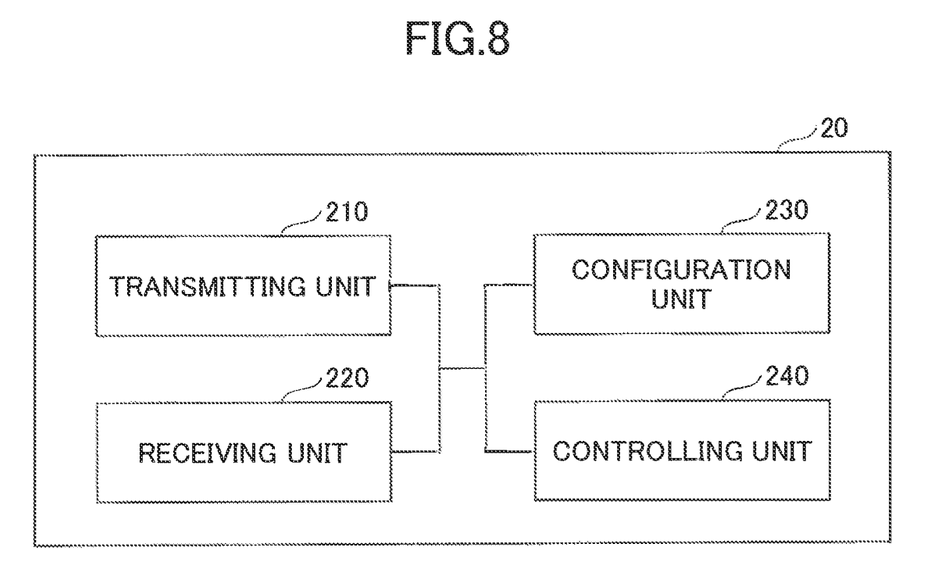
FIG. 8 is a diagram illustrating an example of a functional configuration of a user equipment 20 in an embodiment of the present invention.

FIG. 8 is a diagram illustrating an example of a functional configuration of the user equipment 20. As illustrated in FIG. 8, the user equipment 20 comprises a transmitting unit 210, a receiving unit 220, a configuration unit 230, and a controlling unit 240. The functional configuration illustrated in FIG. 8 is merely an example. Any of functional sections and names of functional units may be used as long as the operations according to an embodiment of the present invention can be performed.

The transmitting unit 210 generates a transmission signal from transmission data and wirelessly transmits the transmission signal. The receiving unit 220 wirelessly receives various signals and obtains information of a higher layer from the received physical layer signal. Also, the receiving unit 220 has a function that receives NR-PSS, NR-SSS, NR-PBCH, DL/UL control signals or the like transmitted from the base station apparatus 10. Further, for example, the transmitting unit 210 transmits to another user equipment 20 PSCCH (Physical Sidelink Control Channel), PSSCH (Physical Sidelink Shared Channel), PSDCH (Physical Sidelink Discovery Channel), PSBCH (Physical Sidelink Broadcast Channel) or the like as a D2D communication. The receiving unit 120 receives the PSCCH, the PSSCH, the PSDCH or the PSBCH from another user equipment 20.

The configuration unit 230 stores various pieces of configuration information in a memory device, and reads out from the memory device if necessary, the configuration information being received by the receiving unit 220 from the base station apparatus 10 or the user equipment 20. The configuration unit 230 also stores predetermined configuration information. Content of the configuration information may be, for example, information of reference signals for a D2D communication or the like.

The controlling unit 240 controls a D2D communication performed with another user equipment 20 as described in the embodiment. Also, the controlling unit 240 performs operations with respect to reference signals in the D2D communication. A functional unit with respect to a signal transmission in the controlling unit 240 may be included in the transmitting unit 210. Also, a functional unit with respect to a signal reception in the controlling unit 240 may be included in the receiving unit 220.

(Hardware Configuration)

The functional configuration diagrams (FIG. 7 and FIG. 8) used in the description of the embodiment of the present invention described above illustrate blocks in the units of functions. These functional blocks (constituent units) are embodied in any combination of hardware and/or software. A means for embodying each functional block is not particularly limited. That is, each functional block may be embodied by one device into which a plurality of elements are physically and/or logically coupled, or may be embodied by two or more devices that are physically and/or logically separated and that are connected directly and/or indirectly (for example, in a wired and/or wireless manner).

Figure 9:
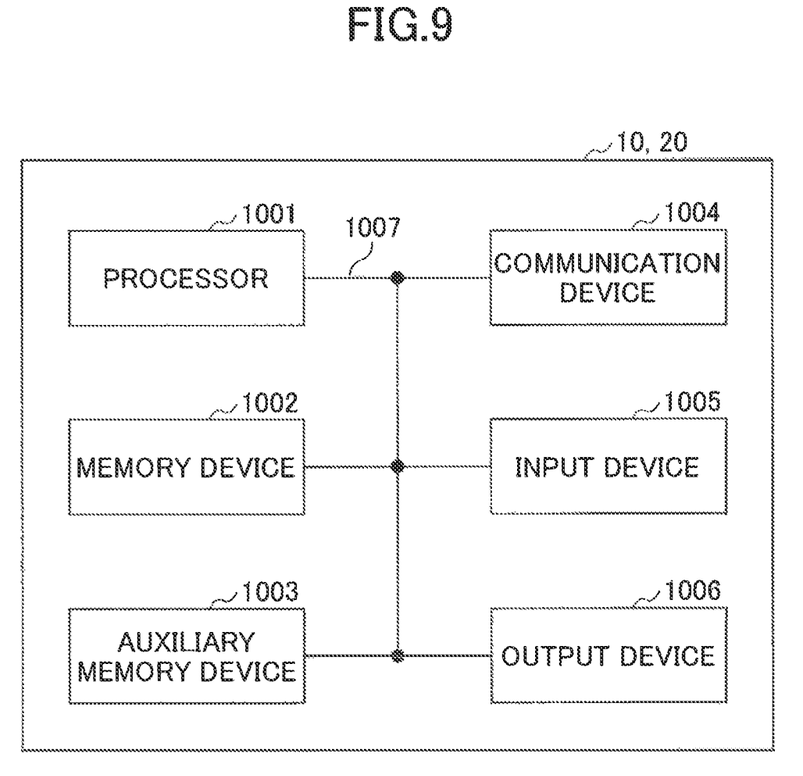
FIG. 9 is a diagram illustrating a hardware configuration of a base station 10 or a user equipment 20 in an embodiment of the present invention.

Also, for example, any of the base station apparatus 10 and the user equipment 20 in an embodiment of the present invention may function as a computer that performs the processes according to the embodiment of the present invention. FIG. 9 is a diagram illustrating an example of a hardware configuration of a radio communication device that is the base station apparatus 10 or the user equipment 20 according to an embodiment of the present invention. Each of the base station apparatus 10 and the user equipment 20 described above may be physically configured as a computer device including a processor 1001, a memory 1002, an auxiliary storage 1003, a communication device 1004, an input device 1005, an output device 1006, a bus 1007, and so on.

In the following description, the term "device" may be interchanged with a circuit, an apparatus, a unit, or the like. The hardware configurations of the base station apparatus 10 and the user equipment 20 may be arranged to include one or more of the devices 1001-1006 illustrated in the figure, or may be arranged not to include some of the devices.

Respective functions in the base station apparatus 10 and the user equipment 20 are realized by causing hardware such as the processor 1001 and the memory 1002 to read predetermined software (program) and causing the processor 1001 to perform computation and to control communication by the communication device 1004 and reading and/or writing of data in the memory 1002 and the auxiliary storage 1003.

The processor 1001 controls the entire computer, for example, by operating an operating system. The processor 1001 may be constituted by a central processing unit (CPU) including an interface with peripheral devices, a control device, a computation device, a register or the like.

The processor 1001 reads a program (program codes), a software module, or data from the auxiliary storage 1003 and/or the communication device 1004 to the memory 1002, and performs various processing operations in accordance therewith. As a program, the program causing a computer to perform at least a part of the operations in the embodiment described above is used. For example, the transmitting unit 110, the receiving unit 120, the configuration unit 130, and the controlling unit 140 of the base station apparatus 10 illustrated in FIG. 7 may be embodied by a control program that is stored in the memory 1002 and operated by the processor 1001. Also, for example, the transmitting unit 210, the receiving unit 220, the configuration unit 230, and the controlling unit 240 of the user equipment 20 illustrated in FIG. 8 may be embodied by a control program that is stored in the memory 1002 and operated by the processor 1001. Although the various processing operations have been described as being performed by a single processor 1001, the various processing operations may be simultaneously or sequentially performed by two or more processors 1001. The processor 1001 may be implemented as one or more chips. The program may be transmitted from a network via an electric communication line.

The memory 1002 is a computer-readable recording medium and may be constituted, for example, by at least one of an ROM (Read Only Memory), an EPROM (Erasable Programmable ROM), an EEPROM (Electrically Erasable Programmable ROM), a RAM (Random Access Memory) or the like. The memory 1002 may be called as a register, a cache, or a main memory (a main storage device). The memory 1002 can store a program (program codes), a software module or the like that can be executed to perform operations according to an embodiment of the present invention.

The auxiliary storage 1003 is a computer-readable recording medium and may be constituted, for example, by at least one of an optical disc such as a CD-ROM (Compact Disc ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, a magnetic strip or the like. The auxiliary storage 1003 may be called as an auxiliary storage device. The recording medium may be a database including the memory 1002 and/or the auxiliary storage 1003, a server, or another appropriate medium.

The communication device 1004 is hardware (a transceiver device) for performing communications between computers via a wired network and/or a wireless network and is referred to as, for example, a network device, a network controller, a network card, a communication module, or the like. For example, the transmitting unit 110 and the receiving unit 120 of the base station apparatus 10 may be embodied by the communication device 1004. The transmitting unit 210 and the receiving unit 220 of the user equipment 20 may be embodied by the communication device 1004.

The input device 1005 is an input device (such as, for example, a keyboard, a mouse, a microphone, a switch, a button, a sensor, or the like) that receives an input from the outside. The output device 1006 is an output device (such as, for example, a display, a speaker, an LED lamp, or the like) that performs outputting to the outside. The input device 1005 and the output device 1006 may be configured to be integrated (such as a touch panel).

The respective devices such as the processor 1001 and the memory 1002 are connected to each other via the bus 1007 for transferring information. The bus 1007 may be constituted by a single bus, or may be configured by different buses between the devices.

Each of the base station apparatus 10 and the user equipment 20 may be configured to include hardware such as a microprocessor, a DSP (Digital Signal Processor), an ASIC (Application Specific Integrated Circuit), a PLD (Programmable Logic Device), an FPGA (Field Programmable Gate Array), or the like, and some or all of respective functional blocks may be embodied by the hardware. For example, the processor 1001 may be implemented as at least one of the above hardware modules.

Summary of Embodiments

As described above, according to an embodiment of the present invention, there is provided a user equipment comprising: a reception unit configured to receive allocation information of reference signals from a base station apparatus or a first user equipment, the reference signals being used in a device-to-device direct communication; a control unit configured to determine a device-to-device direct communication signal based on the allocation information of reference signals used in the device-to-device direct communication; a transmitter for transmitting the determined device-to-device direct communication signal to a second user equipment; and wherein the allocation information of reference signals used in the device-to-device direct communication includes a transmission density of the reference signals used in the device-to-device direct communication.

According to this configuration, it is possible to continue a device-to-device direct communication by dynamically switching an allocation pattern of reference signals, even in an un-stable communication environment in which a relative velocity between user equipments drastically changes. That is, it is possible to use an appropriate reference signal in the device-to-device direct communication.

The allocation information of reference signals used in the device-to-device direct communication may be received through a Physical (PHY) layer signaling or a Media Access Control (MAC) layer signaling, and may include at least one of following 1)-5):

1) a mapping pattern in a frequency domain or a time domain in a resource or a resource pool;
2) a start point or an end point of a resource element (RE) to which a reference signal is allocated;
3) an interval of REs to which reference signals are allocated;
4) an interval of resource blocks (RBs) to which reference signals are allocated; and
5) an index of a slot to which a reference signal is allocated.

According to this configuration, it is possible to indicate the allocation pattern of reference signals in detail, and to rapidly and dynamically indicate the reference signal through the PHY layer signaling or the MAC layer signaling.

When the allocation information of reference signals used in the device-to-device direct communication is received from the first user equipment, the allocation information of reference signals used in the device-to-device direct communication may be implicitly obtained based on a sequence of the reference signal that the first user equipment transmits. According to this configuration, it is possible to obtain the allocation information of reference signals by means of small overhead.

The allocation information of reference signals used in the device-to-device direct communication may be determined based on a feedback of a reception of the device-to-device direct communication signal, the feedback being transmitted from the second user equipment to the base station apparatus or the first user equipment. According to this configuration, it is possible to allocate a reference signal with tracking of a communication environment of the user equipment that receives signals including the allocated reference signal. That is, it is possible to perform a device-to-device communication appropriate for a communication environment by switching to an allocation pattern of reference signals that is determined, by a base station apparatus or a user equipment, based on a feedback obtained from a reception side user equipment.

When the device-to-device direct communication is a multicast or a broadcast and there are plural feedbacks of the reception of the device-to-device direct communication signal, the allocation information of reference signals used in the device-to-device direct communication is determined based on one of:
- a feedback indicating the worst reception environment among the plural feedbacks;
- a feedback indicating the best reception environment among the plural feedbacks; or
- a reception environment to be a median value or an average value of the plural feedbacks.

According to this configuration, when a communication is a multicast or a broadcast, it is possible to switch to an appropriate allocation pattern of reference signals.

According to an embodiment of the present invention, there is provided a base station apparatus comprising: a transmitter for transmitting to a user equipment allocation information of reference signals used in a device-to-device direct communication; a reception unit configured to receive from another user equipment a feedback in relation to reception of a device-to-device direct communication signal, the feedback being determined based on the allocation information of reference signals used in the device-to-device direct communication; a control unit configured to determine allocation information of reference signals used in the device-to-device direct communication based on the feedback in relation to reception of the device-to-device direct communication signal; and wherein the allocation information of reference signals used in the device-to-device direct communication includes a transmission density of the reference signals used in the device-to-device direct communication.

According to this configuration, it is possible to continue a device-to-device direct communication by dynamically switching an allocation pattern of reference signals, even in a un-stable communication environment in which a relative velocity between user equipments drastically changes. That is, it is possible to use an appropriate reference signal in the device-to-device direct communication.

Supplement of Embodiments

While the embodiments of the present invention have been described above, the disclosed inventions are not limited to the embodiments, but it could be understood by those skilled in the art that various modifications, alterations, alternatives, replacements, and the like can be made thereto. While specific numerical examples have been used to facilitate understanding of the present invention, the numerical values are only examples and any appropriate value may be used, unless otherwise specified. The sorting of articles in the above description is not essential to the present invention, but matters described in two or more articles may be combined for use if necessary, or matters described in a certain article may be applied to matters described in another article (unless incompatible). The boundaries of the functional units or the processing units in the functional block diagrams do not necessarily correspond to boundaries of physical components. Operations of two or more functional units may be performed physically by a single component or an operation of a single functional unit may be performed physically by two or more physical components. Regarding the processing procedure described in the embodiment, the order of the processing operations may be changed unless incompatible. For convenience of explanation of the processing, the base station apparatus 10 and the user equipment 20 have been described using the functional block diagrams, but such devices may be embodied in hardware, software, or a combination thereof. Software operated by the processor of the base station apparatus 10 according to the embodiment of the present invention and software operate by the processor of the user equipment 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Notification of information is not limited to the aspects/embodiments described in this specification, but may be performed using other methods. For example, the notification of information may be performed by physical layer signaling (such as DCI (Downlink Control Information), UCI (Uplink Control Information), or the like), higher layer signaling (such as RRC (Radio Resource Control) signaling, MAC (Medium Access Control) signaling, broadcast information (MIB (Master Information Block), SIB (System Information Block), or the like), other signals, or any combination thereof. The RRC signaling may be called as an RRC message and may be, for example, an RRC connection setup message, an RRC connection reconfiguration message, or the like.

The aspects/embodiments described in this specification may be applied to systems utilizing LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or next-generation systems which is enhanced based on these systems.

The processing procedures, sequences, flowcharts, or the like of the aspects/embodiments described above in this specification may be changed in the order as long as they are not incompatible with each other. For example, in the method described in this specification, various step elements are presented in an exemplary order and the method is not limited to the presented order.

The specific operations which are performed by the base station apparatus 10 in this specification may be performed by an upper node thereof in some cases. In a network comprising one or more network nodes including the base station apparatus 10, it is obvious that various operations which are performed to communicate with the user equipment 20 can be performed by the base station apparatus 10 and/or another network node (for example, a Mobility Management Entity ("MME") or a Serving Gateway ("S-GW") can be considered but the network node is not limited thereto) other than the base station apparatus 10. Although a case where the number of network nodes other than the base station apparatus 10 is one has been illustrated above, a combination of two or more other network nodes (for example, an MME and an S-GW) may be used.

The aspects/embodiments described in this specification may be used alone, may be used in combination, or may be switched with implementation thereof.

The user equipment 20 may also be called, by a person in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other appropriate term.

The base station apparatus 10 may be called, by a person in the art, as an NB (NodeB), an eNB (enhanced NodeB), a gNB, a base station, or some other appropriate terms.

The terms "determining" and "deciding" as used in this specification may include various types of operations. For example, "determining" and "deciding" may include, for example, events in which events such as judging, calculating, computing, processing, deriving, investigating, looking up (e.g., searching in a table, a database, or another data structure), or ascertaining are regarded as "determining" or "deciding". Further, "determining" and "deciding" may include, for example, events in which events such as receiving (e.g., reception of information), transmitting (e.g., transmission of information), input, output, or accessing (e.g., accessing data in memory) are regarded as "determining" or "deciding". Furthermore, "determining" and "deciding" may include, for example, events in which events such as resolving, selecting, choosing, establishing, or comparing are regarded as "determining" or "deciding". In other words, "determining" and "deciding" may include events in which a certain operation is regarded as "determining" or "deciding".

A phrase "on the basis of" used in this specification is not limited to "on the basis of only" unless otherwise stated. That is, a phrase "on the basis of" means both "on the basis of only" and "on the basis of at least".

As long as the terms "include" and "including" and derivatives thereof are used in this specification or the appended claims, the these terms are intended to have a comprehensive meaning similar to a term "comprising". Further, the term "or" as used in this specification or the appended claims is intended not to be an exclusive disjunction.

In the entire disclosure, for example, when an article such as "a", "an" or "the" is added in translation into English, such an article may include the plural unless it is obviously indicated that such an article does not include the plural.

In addition, in an embodiment of the present invention, a transmission pattern of a SL-PTRS and/or a SL-CSI-RS is one example with respect to the allocation information of reference signals used in a device-to-device direct communication. The user equipment 20 having a scheduling capability is one example with respect to the first user equipment. The reception side user equipment 20B is one example with respect to the second user equipment.

Although the present invention has been described in detail, it is obvious for those skilled in the art that the present invention is not limited to the embodiments described in this specification. The present invention can be implemented as modifications and alterations without departing from the spirit and scope of the present invention defined in the description of the claims. Therefore, the description in this specification is intended to be exemplary description and does not have any restrictive meaning to the present invention.

LIST OF REFERENCE SYMBOLS

10 base station apparatus
110 transmitting unit
120 receiving unit
130 configuration unit
140 controlling unit
20 user equipment
210 transmitting unit
220 receiving unit
230 configuration unit
240 controlling unit
1001 processor
1002 memory device
1003 auxiliary memory device
1004 communication device
1005 input device
1006 output device

The invention claimed is:

1. A terminal comprising:
a reception unit configured to receive allocation information of reference signals from a base station, the reference signals being used in a sidelink communication that is a direct communication between the terminal and another terminal;
a control unit configured to autonomously switch a transmission density in a time domain and a transmission density in a frequency domain of the reference signals, based on the allocation information of the reference signals; and
a transmitter configured to transmit the reference signals to another terminal, based on the transmission density in the time domain and the transmission density in the frequency domain,
wherein a transmission pattern of the reference signals, the transmission pattern being specified based on the allocation information of the reference signals, includes an interval of resource elements in which the reference signals are allocated in the time domain and the frequency domain in a resource pool.

2. The terminal as claimed in claim 1, wherein
the reception unit receives the allocation information of the reference signals via radio resource control (RRC) signaling from the base station, and
the control unit configures switching candidates for the reference signals, based on the RRC signaling.

3. The terminal according to claim 1, wherein the reference signals are phase tracking reference signals (PTRSs).

4. The terminal according to claim 2, wherein
the control unit is configured to determine positions of the resource elements in which the reference signals are allocated, based on the allocation information of the reference signals.

5. A communication method performed by a terminal, the communication method comprising:
receiving allocation information of reference signals from a base station, the reference signals being used in a sidelink communication that is a direct communication between the terminal and another terminal;

autonomously switching a transmission density in a time domain and a transmission density in a frequency domain of the reference signals, based on the allocation information of the reference signals; and transmitting the reference signals, whose transmission density in the time domain and transmission density in the frequency domain have been switched, to another terminal, wherein a transmission pattern of the reference signals, the transmission pattern being specified based on the allocation information of the reference signals, includes an interval of resource elements in which the reference signals are allocated in the time domain and the frequency domain in a resource pool.

* * * * *